United States Patent

Weirauch et al.

Patent Number: 5,692,699
Date of Patent: Dec. 2, 1997

[54] SPLICING TAPE, SPLICING METHOD AND SPLICE USING THE SPLICING TAPE

[75] Inventors: Hans Julius Weirauch, Neuss, Germany; Kees Kleinjan, Maassluis; Emile Couvee, Nijmegen, both of Netherlands; Max Holderbusch, Neuss, Germany

[73] Assignees: Minnesota Mining and Manufacturing Company, St. Paul, Minn.; KNP Papier B.V., Maastricht, Netherlands

[21] Appl. No.: 553,252
[22] PCT Filed: Apr. 26, 1994
[86] PCT No.: PCT/EP94/01407
 § 371 Date: Jan. 30, 1996
 § 102(e) Date: Jan. 30, 1996
[87] PCT Pub. No.: WO94/25380
 PCT Pub. Date: Nov. 10, 1994

[30] Foreign Application Priority Data

Apr. 26, 1995 [NL] Netherlands ............... 9300707

[51] Int. Cl.⁶ ...................................... B65H 19/18
[52] U.S. Cl. ........................................ 242/556.1
[58] Field of Search ................ 242/556, 556.1; 156/502, 504, 507

[56] References Cited

U.S. PATENT DOCUMENTS

| | | | |
|---|---|---|---|
| 2,377,971 | 6/1945 | Roesen | 242/556.1 |
| 4,564,150 | 1/1986 | Keene et al. | |
| 4,905,924 | 3/1990 | Moore . | |
| 5,212,002 | 5/1993 | Madzrak et al. | 242/556.1 |
| 5,275,344 | 1/1994 | Ray | 242/556.1 |
| 5,277,731 | 1/1994 | Krimsky et al. | 156/504 |
| 5,301,891 | 4/1994 | Duguay | 242/556 |
| 5,318,656 | 6/1994 | Dylla et al. | 242/556 |
| 5,323,981 | 6/1994 | Dionne . | |
| 5,397,076 | 3/1995 | Padilla | 242/556.1 |

FOREIGN PATENT DOCUMENTS

| | | | |
|---|---|---|---|
| 418527 | 3/1991 | European Pat. Off. . | |
| 0 555 772 A1 | 8/1993 | European Pat. Off. . | |
| 31 23 414 | 4/1982 | Germany . | |
| 42 10 329 A1 | 10/1993 | Germany | 242/556.1 |
| WO 90/08032 | 7/1990 | WIPO . | |
| WO 94/25381 | 11/1994 | WIPO | 242/556.1 |

*Primary Examiner*—John P. Darling
*Attorney, Agent, or Firm*—Merchant, Gould, Smith, Edell, Welter & Schmidt, P.A.

[57] ABSTRACT

A splicing tape (100) includes a splicing portion (1, 2) and an attachment portion (10", 41), the attachment portion (10", 41) being provided for releasably and self-supportively attaching the splicing tape (100) substantially across the width of a roll of sheet material. A first adhesive layer (2) is provided to attach the leading edge of the roll to the splicing tape (100). The attachment portion (10", 41) is adapted to release the leading edge and splicing portion (1, 2) from the underlying sheet material leaving a non-tacky first surface of the underlying sheet material. A butt or overlap splice can be completed by attaching a further sheet material to the splicing portion (1, 2). The attachment portion (10", 41) includes preferably portions (10") for separating the attachment portion from the splicing portion (1, 2) and/or portions (41) for detaching the attachment portion from the surface of the underlying layer. Methods of making permanent or flying splices are provided.

21 Claims, 5 Drawing Sheets

SPLICING TAPE, SPLICING METHOD AND SPLICE USING THE SPLICING TAPE

TECHNICAL FIELD

The present invention relates to permanent or flying splices between sheet materials, a splicing tape for use in producing such splices and methods of using the splicing tape in producing butt, and overlap, particularly staggered overlap splices.

BACKGROUND OF THE INVENTION

Figure 3A:
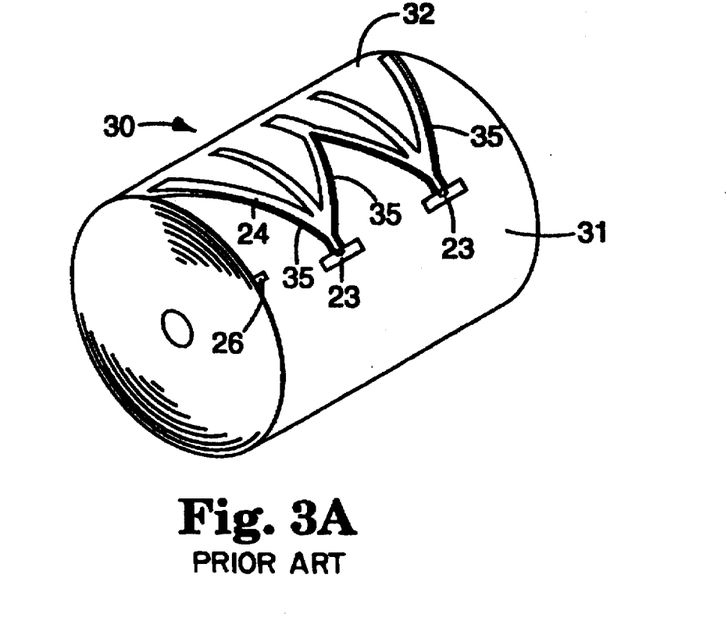
FIG. 3A shows the roll preparation of a conventional flying splice.
Figure 3B:
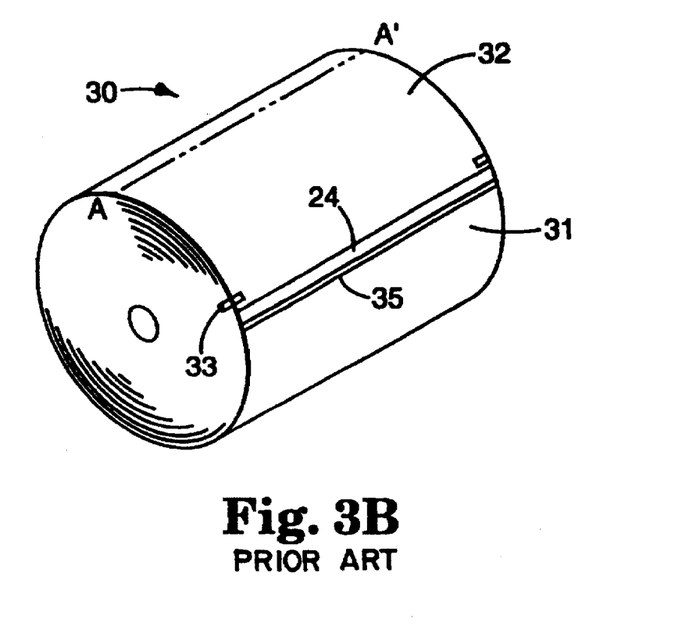
FIG. 3B shows the roll preparation of a conventional permanent splice.

In this application and merely for clarity purposes the leading end and edge of a winding of sheet material on a roll is considered to be the first quadrant of sheet material exposed on the outside of the roll, i.e. the section 32 of sheet material shown in FIG. 3B from the imaginary line A—A' to the edge 35. The underlying winding 31 of such a roll is then the piece of sheet material on which the leading edge 35 rests from A—A' through 360° to the position A—A' again.

Two common types of splice are known for webs of sheet materials. Firstly, there is a permanent splice for joining the leading edge of one roll or part roll to the trailing edge of a further roll or part roll. The permanent splice should provide a flexible strong connection between the two webs and should maintain substantially all of the properties of the sheet material, for example if the sheet material is paper which can be printed or coated, the permanent splice is preferably, thin, flexible, printable, coatable and should also have the same repulpable properties as paper. Conventional splicing tapes and splices do not generally meet all of these requirements. Further, when joining part rolls the second roll is normally wound back onto the first roll in order to produce a complete roll and the permanent splice is then located somewhere in the middle of the new larger roll. This splice is subject to high pressures caused by the winding tension and it is important that no adhesive materials are present either on or near the splice or bleed out of the splice during storage which could adhere layers of sheet material together or damage or obstruct printing machinery.

Figure 1A:
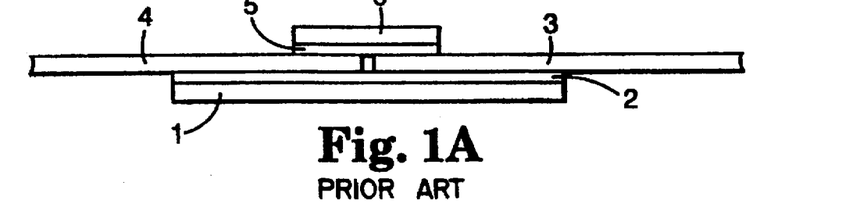
FIGS. 1A to 1C show various types of permanent splices.
Figure 7:
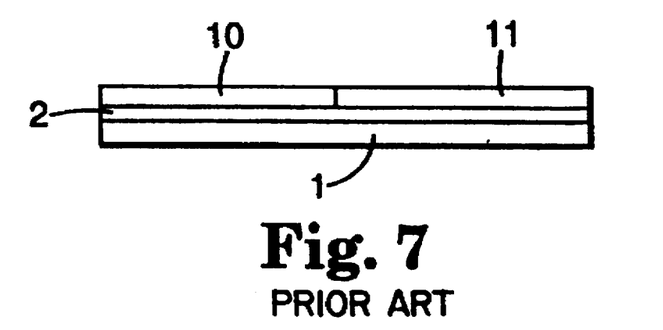
FIG. 7 shows a conventional butt splicing tape.

A typical permanent butt splice is shown in FIG. 1A. Such a splice can be manufactured using a splicing tape as shown in FIG. 7 and described in WO 90/08032.

Figure 1B:
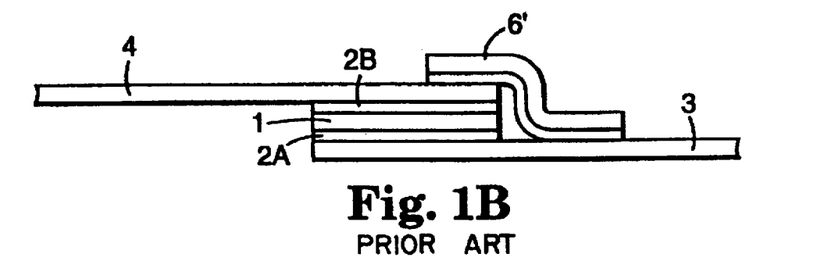

A permanent overlap splice is also known as is shown in FIG. 1B. Here the leading and trailing edges 3 and 4 of the first and second rolls are joined together by a double sided tape of the kind shown in FIG. 8. With reference to FIG. 3B the last winding 32 of the roll 30 is secured by small adhesive tabs 33 applied on both sides of the roll 30. One of the release foils 10 (or 11) is then removed from the double sided tape 24 to expose the pressure sensitive adhesive 2A (or 2B) and the tape is applied across the width of the last winding 32 of the roll. The excess of the leading edge is folded back against the double sided tape and is creased and torn off so that the final leading edge 35 abuts the double sided adhesive tape 34 as shown in FIG. 3B. In this condition the roll may be stored until a splice must be made. In order to complete the splice the remaining release foil 11 (or 10) is removed thus exposing the pressure sensitive adhesive 2B (or 2A) and the trailing edge of the second roll is then applied to the exposed pressure sensitive adhesive. The excess of the trailing edge is folded back to the adhesive join and is creased and torn off in the same way as described above with respect to the leading edge of the first roll. The splice now appears as in FIG. 1B.

This type of splice has a disadvantage that there is a considerable step at the change from the sheet material 3 or 4 and the splice itself when compared with the butt splice shown in FIG. 1A. This step can disrupt the printing process. Further, there is the possibility of the adhesive bleeding out of the splice or bleeding through the paper if placed under pressure. Additionally, the webs of sheet material may move relative to each other when tension in the web puts the splice in shear. If movement occurs during multiple pass printing the alignment in successive printing stages is disturbed resulting in inferior quality. Any relative movement is likely to release adhesive with the serious consequences mentioned above. To prevent this movement an additional adhesive tape 6' is sometimes applied along the edge of the splice as shown in FIG. 1B. This improves the strength of the splice but increases its thickness still further.

Since a paper manufacturer is often held liable by the printer for damage caused by the splice it is desirable to provide a reliable splicing method and splice which does not affect the printing process. In particular a sheet surface with exposed aggressively tacky adhesive is considered not to be machine printable.

Figure 1C:
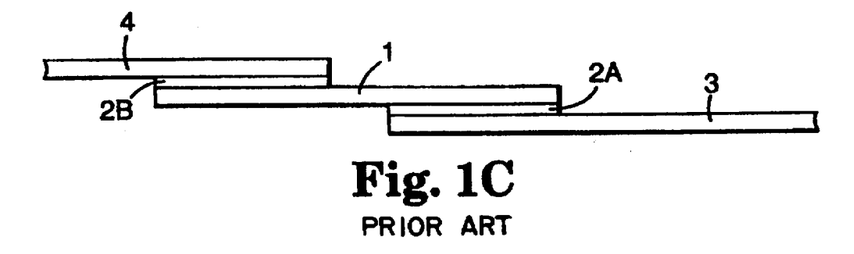
Figure 8:
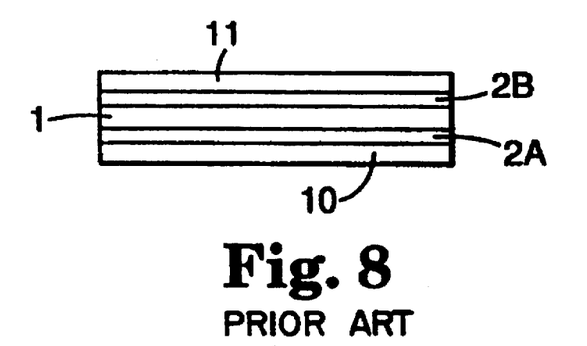
FIG. 8 shows a conventional overlap splicing tape.
Figure 9:
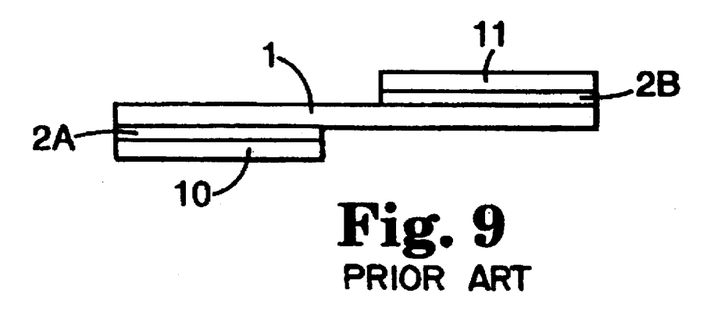
FIG. 9 shows a staggered overlap splicing tape.

In order to reduce the step at the splice, a staggered overlap splice as shown in FIG. 1C has been proposed in the non-prepublished document EP-0555772 which can also be produced with a splicing tape shown in FIG. 9. The splice in accordance with FIG. 1C may still suffer from the bleeding out problems of the overlap splice shown in FIG. 1B and has the further disadvantage that the leading edge of the first roll must be cut to a straight line before application of the tape rather than being able to tear off the leading against the adhesive join as is possible with tapes shown in FIGS. 7 and 8. Splicing can also become necessary when insufficient sheet material is left on one drum. Webs from two drums must then be attached together. Flying splices are usually temporary splices made at machine running speeds between rolls when it is undesirable to stop the machine, e.g. during coating or printing. The surface speed of the roll can be 1000 or even 2000 meters per minute. The conventional way of making a flying splice can be understood from FIG. 3A with reference to U.S. Pat. No. 4,564,150. Double sided adhesive tape 24 similar to that shown in FIG. 8 is applied to the last winding 32 of a roll 30 of sheet material in the form of a W, a V or any other suitable arrangement. The last winding 32 of sheet material is torn off against the adhesive tape 24 leaving small wings 23 which are secured by small pieces of adhesive tape to the underlying layer 31 of sheet material. The adhesive tabs and the small wings 23 are important to hold down the noses of the last winding 32 of the sheet material when the roll is travelling at machine rotation speeds. It is important that air cannot enter beneath the leading edge 35 of the last winding 32 which would result in the roll unwinding itself at very high speeds which could cause damage to the equipment and danger to the operators. In order to prevent air entering beneath the leading edge 35 of the last winding 32, small adhesive tabs are sometimes applied not only at the noses of the leading edge but also along the diagonal edges of the leading edge 35. Completion of the splice is described in U.S. Pat. No. 4,564,150. The final splice appears as in FIG. 2B. The leading edge 3 of the new roll is attached to the trailing edge 4 of the old roll by means of the double sided tape 1, 2A, 2B and the excess of the trailing edge left after cutting is indicated by 8.

One method of reducing the step height of an overlap splice is described in U.S. Pat. No. 4,905,924. The splicing tape has no backing member. The splicing tape has a section for attachment to the underlying winding which can be torn off.

Figure 2A:
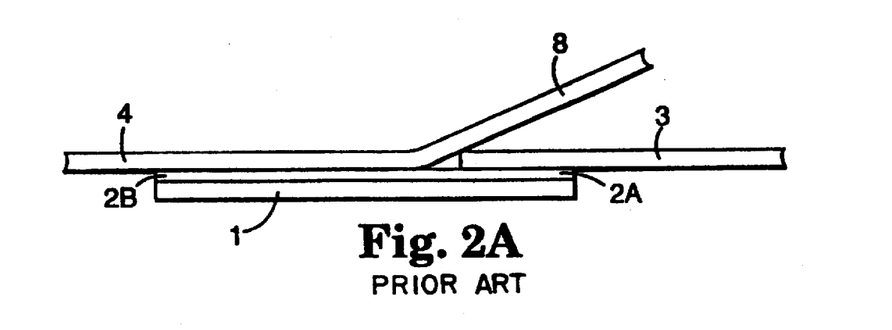
FIGS. 2A and 2B show various types of flying splices.
Figure 2B:
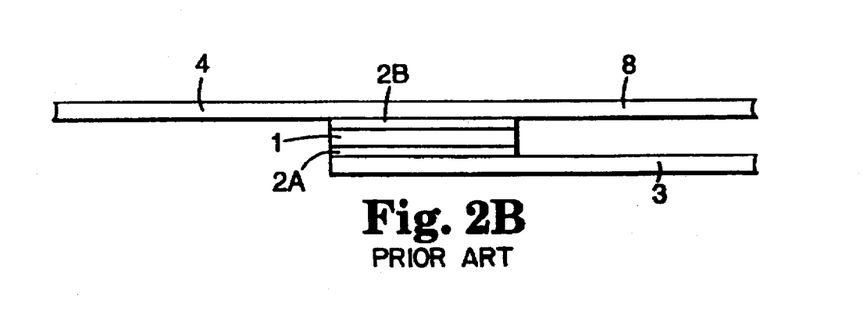

It is possible to make a flying butt splice with a butt splicing tape of the kind shown in FIG. 7. The splicing tape as shown in FIG. 7 would be modified so that the adhesive area for attachment to the trailing edge of the old roll is made considerably larger than the area of adhesive available for attachment to the leading edge of the new roll. The final splice is shown in FIG. 2A in which the leading edge of the new roll has been attached to the splicing tape via the pressure sensitive adhesive 2B and the trailing edge of the old roll has been attached to the greater area of pressure sensitive adhesive 2A leaving the excess of the trailing edge 8 to trail behind.

Although the low step profile of the butt splice would be preferred for both permanent and the flying splices, several disadvantages with the application of the tape have resulted in this tape not being widely used for either permanent or flying splices. Firstly, a tape of the kind shown in FIG. 7 must be stretched across the width of a roll which may be 4 to 10 meters wide with the non-adhesive side of the backing I adjacent to the roll. This is usually done by two or more operators who provisionally may tape the roll into its final position using small pieces of adhesive tape. Such a procedure is time consuming and there is the danger that the small pieces of tape are not removed after application of the tape. Secondly, adhesive may be transferred from the tabs to the sheet material which can result in subsequent bonding between layers of the sheet material or fouling of rollers or other parts of the printing machinery. Thirdly, flying butt splices have not found favour because it is necessary to lift the leading edge of the new roll in order to apply such tapes. This lifting of the leading edge allows air to enter between the leading end 22 of the new roll and the underlying layer 21 of the roll and thus there is an increased danger of the leading edge lifting off from the roll when it has reached machine speeds. The same problem of lifting the leading edge may also occur if a staggered overlap flying splice were to be made with the splicing tape shown in FIG. 9.

In DE-A-033900, a modified flying butt splicing tape is proposed. This splice tape leaves an exposed surface of adhesive on the underlying winding of the roll at a distance of approximately one circumference of this roll from the actual splice. This exposed adhesive layer is capable of picking up sheet remnants or attaching itself to other objects or parts of the machinery which can disrupt smooth operation. In particular the exposed adhesive is left on the radially outwardly facing surface (referred to in the rest of this application as the outer surface of a layer of sheet material on a roll) of the roll. The exposed tacky adhesive on the outer surface of the underlying winding may render the sheet material unsuitable for machine printing. Further once the splicing tape has been temporarily attached to the roll it cannot be repositioned.

SUMMARY OF THE INVENTION

The present invention provides a splicing tape for splicing the leading edge of a roll of sheet material to a further sheet material, each winding of said sheet material on said roll having an outer surface facing radially outwards away from said roll, comprising:

a splicing portion and a pre-formed attachment portion, characterized in that said splicing portion comprises:

an elongate backing member;

an adhesive layer on said backing member, a first part layer of said adhesive layer being provided for attachment of the leading edge of the roll of sheet material substantially across the width of said roll to said backing member and a second part layer of said adhesive layer being for attachment to said further sheet material;

and that said pre-formed attachment portion is connected to and distributed along said splicing portion for releasable and self-supportive attachment of said splicing tape to the outer surface of the underlying winding of said roll of sheet material substantially across the width of said roll, said attachment portion being adapted for releasing at least said splicing portion from said underlying winding of said roll while leaving the outer surface of said underlying winding in a non-tacky condition.

The present invention also provides a splice on the leading edge of a roll of sheet material for attachment to a further sheet material, each winding of said sheet material on said roll having an outer surface facing radially outwards from said roll, comprising:

a splicing portion and a pre-formed attachment portion, characterized in that said splicing portion comprises:

an elongate backing member;

an adhesive layer on said backing member, a first part layer of said adhesive layer attaching the leading edge of the roll of sheet material substantially across the width of said roll to said backing member and a second part layer of said adhesive layer being provided for attachment to said further sheet material;

and that said pre-formed attachment portion is connected to and distributed along said splicing portion and releasably and self-supportively attaching said splicing tape to the outer surface of said underlying winding of said roll of sheet material substantially across the width of said roll, said attachment portion being adapted for releasing at least said splicing portion from said underlying winding of said first roll while leaving the outer surface of said underlying winding in a non-tacky condition.

The present invention further provides a method for preparing a splice between the leading edge of a roll of sheet material and a further sheet material using a splicing tape, each winding of said sheet material on said roll having an outer surface facing radially outwards away from said roll, said splicing tape comprising:

a splicing portion and a pre-formed attachment portion, in which method said splicing tape is attached to the outer surface of said underlying winding using said attachment portion substantially across the width of said roll, characterized in that said splicing portion comprises:

an elongate backing member;

an adhesive layer on said backing member and covered by at least one release foil, a first part layer of said adhesive layer being provided for attaching the leading edge of said roll of sheet material substantially across the width of said roll to said backing member and a second part layer of said adhesive layer being provided for attachment to said further sheet material;

that said pre-formed attachment portion is connected to and distributed along said splicing portion for self-supportively and releasably attaching said splicing tape to the outer surface of the underlying winding of said roll of sheet material substantially across the width of said roll, said attachment portion being adapted for releasing at least said splicing portion from the underlying winding of said roll while leaving the outer surface of the underlying winding in a non-tacky condition, and that said method further comprises the steps of:

exposing the first part layer of said adhesive layer;

attaching said leading edge to the exposed first part layer of said adhesive layer; and separating said attachment portion from said splicing portion attached to said leading edge while leaving the outer surface of said underlying winding in a non-tacky condition.

In addition the present invention provides a method for making a splice between the leading edge of a roll of sheet material and a further sheet material using a splicing tape, each winding of said sheet material on said roll having an outer surface facing radially outwards away from said roll, said splicing tape comprising:

a splicing portion and a pre-formed attachment portion, in which method said splicing tape is attached to the outer surface of said underlying winding using said attachment portion substantially across the width of said roll, characterized in that said splicing portion comprises:

an elongate backing member;

an adhesive layer on said backing member and covered by at least one release foil, a first part layer of said adhesive layer being provided to attach the leading edge of the roll of sheet material substantially across the width of said roll to said backing member, and a second part layer of said adhesive layer being provided for attachment to the further sheet material;

that said pre-formed attachment portion is connected to and distributed along said splicing portion for self-supportively and releasably attaching said splicing tape to the outer surface of the underlying winding of said roll of sheet material substantially across the width of said roll; said attachment portion being adapted for releasing at least said splicing portion from the underlying winding of said roll while leaving the outer surface of the underlying winding in a non-tacky condition, and that said method further comprises the steps of:

exposing said first part layer of said adhesive layer, attaching said leading edge to the exposed first part layer of said adhesive layer;

exposing said second part layer of said adhesive layer, attaching the further sheet material to the exposed second part of said adhesive layer; and releasing said leading edge and said splicing portion attached thereto from said underlying winding while leaving the outer surface of said underlying winding non-tacky.

The present invention may provide the advantage of a splicing tape for a low step profile splice which can pass through subsequent coating and printing machinery smoothly.

Further the splicing tape in accordance with the invention may be applied quickly and accurately.

Additional embodiments of the invention are given in the dependent claims.

Further advantages and embodiments of the invention are described in the following with reference to the drawings.

DETAILED DESCRIPTION OF THE PREFERRED EMBODIMENTS

In the following description of the preferred embodiments of the present invention the same reference signs are used for similar components of the splicing tape throughout the figures.

It should be noted that the thickness of adhesive layers, foils and backing tapes have been exaggerated in the figures for clarity purposes.

Figure 4:
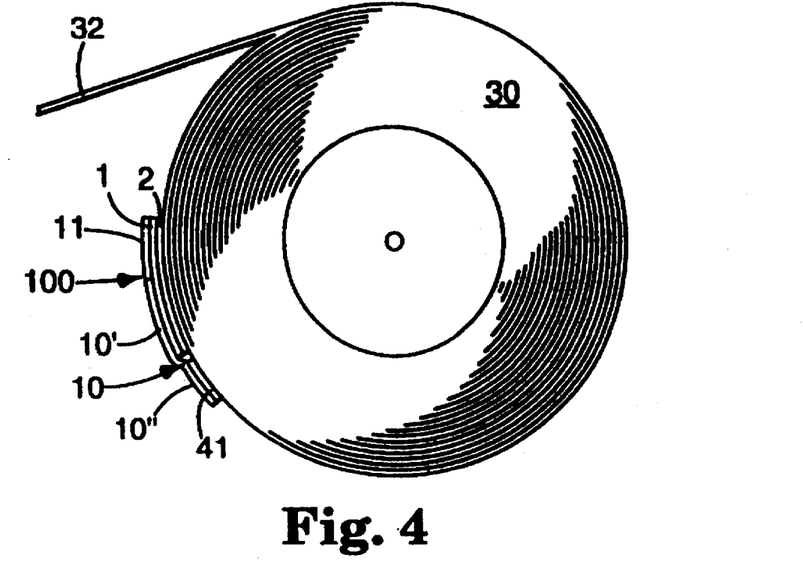
FIG. 4 shows a butt splice in accordance with the first embodiment of the invention.
Figure 5A:
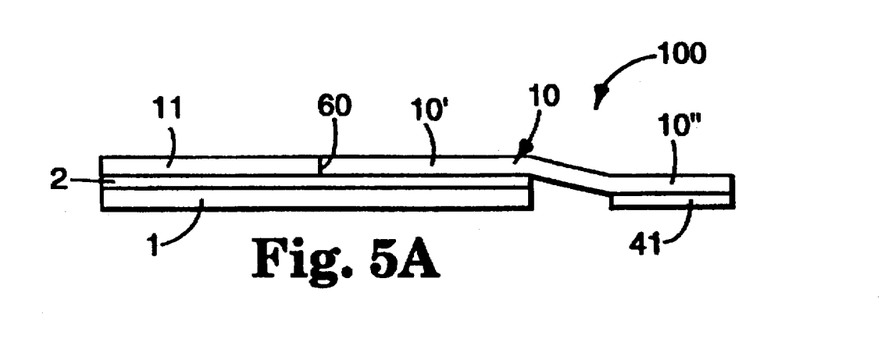
FIGS. 5A and 5B show the first embodiment of a butt splicing tape in accordance with the present invention.

FIG. 5A shows a first embodiment of the present invention constructed as a butt splicing tape in particular for forming a permanent butt splice between two sheet materials in particular paper. FIG. 4 shows the way in which the splice, according to FIG. 5A, can be made using the method of the invention, even when using very wide webs, and without requiring more than one operator to make the splice. In FIG. 4 the same parts as in FIG. 3B are indicated by the same reference numbers. End 32 of the last winding must be spliced. Splicing tape 100 is applied to the last preceding paper winding 31 still present on drum 30. Splicing tape 100 comprises a splicing portion including a backing 1 with a pressure sensitive adhesive layer 2 on one side, as well as a first release foil 11, which extends over approximately half of the width of the adhesive layer on backing 1, and a second release foil 10 comprising a first part 10', located on the remaining surface of the adhesive layer on backing 1, and a second part 10", which extends beyond the longitudinal edge of backing 1 and which has a layer of adhesive 41 which may have a relatively light adhesive strength on the side facing the adhesive layer 2, and which leaves no substantial quantities of adhesive on the substrate when removed. This type of adhesive layer 41 is preferably of the repositionable type used on the memo stickers of the "Post-It"® brand made by Minnesota Mining and Manufacturing Company, St. Paul, Minn., USA. In particular the adhesive layer 41 made be the type used on Correction & Cover-up Tape 658® manufactured by the above Company. The adhesive layer 41 may also be of the kind applied to Scotch Masking Tape 1104® also made by the above-mentioned Company. The adhesive layer 41 may be made to adhere to the release foil 10 by priming the respective part of the surface of the release foil 10. Further, the adhesive layer 41 need not be applied continuously along the release foil 10 but may be applied intermittently along its length.

Splicing tape 100 is temporarily attached to the last paper winding 31 still on the drum with an attachment portion provided by the release foil 10 and the layer of adhesive 41. In this way, the smooth, non-sticky side of the splicing tape 100 facing the drum is prevented from moving whilst the splice is being made, and does not have to be held in place by a large number of operators. Release foil 11 is then removed, as a result of which a part of the sticky side of splicing tape 100 is exposed onto which web end 32 is fixed in such a way that the edge of this end is close to the edge of release foil 10. If part of the web 32 extends over the release foil 10, it can be torn off straight, as is usual in the paper industry, at the transition between foil 11 and release foil 10. After this, splicing tape 100 can no longer move with respect to the web end 32, because it is fixed to end 32. Release foil 10 can now also be removed entirely, which means that the remaining part of adhesive layer 41 comes away from the underlying winding as well as the splicing tape 100. It is preferable that, when release foil 10 is removed, adhesive 41 leaves substantially no adhesive on the underlying paper winding i.e. it leaves a non-tacky surface, since this adhesive may otherwise disrupt the way the paper is subsequently printed. It has been shown that adhesives of the type mentioned above are adequate for this, but other adhesives with this property can also be used.

After removal of release foil 10, the further end of the other web can be fixed on the exposed part of the adhesive layer 2 of splicing tape 100. Any part of the further end extending over web part 32 can again be torn off to the correct length in order to form a neat splice. For the sake of clarity, this end is not shown in FIG. 4. Covering adhesive tape 6 can now simply be applied over the splice thus formed as shown in FIG. 1A, preventing adhesive from splicing tape 100 from escaping via the splice to the side of the web opposite splicing tape 100, which can cause faults when printing the paper.

An additional advantage of the method according to the invention is that, after removing the second release foil 10, the paper reel can be rotated in order, if necessary, to simplify application of the further end of sheet material.

The backing 1 is typically similar in strength and flexibility to the sheet materials to be joined and may be plastic or paper or any similar sheet material. When paper sheets are to be joined it is preferable if the backing material 1 as well as all other materials which remain in the completed splice are repulpable and/or water soluble and/or water dispersible. The thickness of the backing is typically in the range 50–100 micro meters and the width is typically 50–100 millimeters. The surface of the backing 1 should preferably be coatable and/or printable. Suitable materials for joining paper rolls would be super calendered (glassine) or semi-bleached kraft paper. On one side of the backing 1 a pressure sensitive adhesive (PSA) layer is applied which may be continuous across the width of the tape as shown in FIG. 5A or may consist of two separate strips of adhesive with a gap there between. The PSA may be an adhesive of the acrylic, rubber resin, silicone or similar types. It is preferable if the PSA is repulpable. It is particularly preferred if the PSA is a repulpable acrylic adhesive. The thickness of the PSA layer may be typically 2 to 100 micrometers. The PSA layer is protected by a release foil 10, 11 which is provided with a longitudinal weakness or perforation in the middle thereof. The release foils 10, 11 may also be two separate release foils 10 and 11 adjacent to each other or a single release foil which has been slit in the centre. The release foils may be of any suitable conventional kind, e.g. silicon or waxed papers with a typical thickness of 30–150 micrometers. It is preferable but not necessary for the invention if the release foils are repulpable.

The above description of the first embodiment demonstrates certain aspects of the present invention. Firstly, a portion of the splicing tape 100, namely a part of the release foil 10" and the weakly adhering adhesive layer 41, is connected to and distributed along the splicing portion 1, 2. This attachment portion 10", 41 is used to temporarily attach the splicing tape 100 to the roll of sheet material. The attachment portion of the splicing tape 100 is sufficient that the splicing tape is self-supporting on the roll, i.e. when applied in a straight line it is capable of supporting its own weight without sagging or pulling.

Secondly, the attachment portion of the splicing tape 100 may be separated from the splicing portion 1, 2 by removing the release foil 10 from the PSA layer 2. This separation of the attachment portion of splicing tape 100 from the splicing portion 1, 2 may be carried out by different means (foil 10, PSA 2) than the means for detachment of the attachment portion from the underlying sheet material (weakly adhering layer 41). Separation of the attachment portion from the splicing tape 100 may be sufficient to release the splicing portion 1, 2 from its temporary attachment to the sheet material.

Thirdly, the attachment portion of the splicing tape may be detached from the underlying sheet layer. Detachment of the attachment portion from the underlying sheet material may be sufficient, independent of separation of the attachment portion from the splicing tape 100, to release the splicing tape 100 from its temporary attachment to the sheet material.

Thus in accordance with the present invention the splicing tape 100 may be temporarily attached to the roll of sheet material and subsequently released therefrom leaving a non-tacky outer surface of the underlying layer of sheet material. This outer surface is in a condition to be machine coated and/or printed.

Embodiments with both separating and detaching means are particularly preferred for permanent splices as the attachment portion may be removed from the splice area. The weakly adhering adhesive layer 41 may be a repositionable adhesive layer made from any known repositionable adhesive. For the purposes of this invention a repositionable adhesive has a property of adhering to and being removable from the surface of a substrate without transfer of substantial qualities of the adhesive material to the substrate surface. This is achieved by making the adhesion of the adhesive layer 41 to the release foil 10 (if necessary by priming the surface of the release foil 10) considerably greater than the adhesion of the adhesive layer 41 to a sheet substrate. Further, after removal it is preferable if the adhesive layer retains substantially its adhesive properties so that it may be reapplied to the same substrate surface. A repositionable adhesive may have a peel strength lower than for a conventional aggressively tacky PSA. In particular, it is preferable if the removal of the repositionable adhesive layer from the paper substrate does not damage the surface fibres of the paper. After detachment, printing properties of the paper surface should not be deteriorated.

Figure 5B:
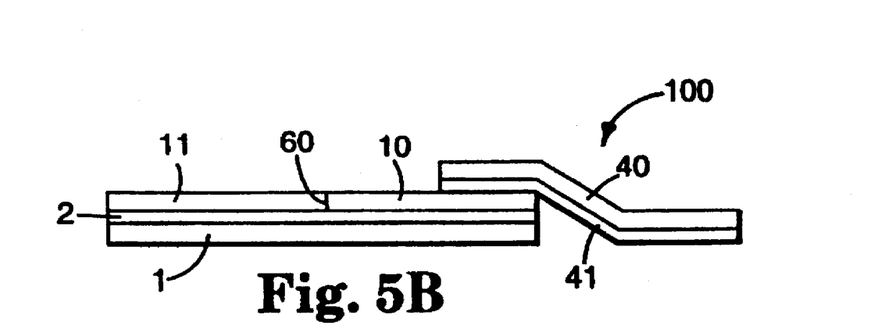

FIG. 5B shows a variation of splicing tape 100 according to the first embodiment of the invention and is made from materials similar to those described for FIG. 5A.

Release foils 10 and 11 are similar to those for the adhesive tape according to FIG. 5a, but foil 10 is now approximately the same width as foil 1—1. An additional adhesive tape 40, 41 is applied to, i.e. connected to and distributed along the free side of foil 10. The additional adhesive tape comprises a backing 40 and, on one face of it, the slightly adhering adhesive layer 41. Tape 40, 41 extends over the side edge of foil 10 and provides, in the same way as in FIG. 5A, the attachment portion of the splicing tape 100 for temporary attachment to the web on reel 30.

The further adhesive tape 40, 41 is removably attached in an overlapping fashion to the release foil 10 as shown in FIG. 5B. The adhesive layer 41 may be a repositionable adhesive layer 41. The backing 40 may be any suitable backing material and is not necessarily repulpable or water soluble as this layer is subsequently removed from the splice. It is, however, preferable if all materials used in the splicing tapes in accordance with the invention are repulpable. The backing layer 40 is typically 15–50 mm wide. It is preferred that adhesive tape 40, 41 is Correction & Cover-up Tape 658® or Scotch Masking Tape 1104® made by Minnesota Mining and Manufacturing Company, St. Paul, Minn., U.S.A.

The adhesive tape 40, 41 may be applied continuously on the length of the main splice tape 1, 2, 10, 11 or discrete lengths of the adhesive tape 40, 41 may be pre-applied intermittently, i.e. distributed, along the main splice tape 1, 2, 10, 11. The spacing for the intermittent stripes should be sufficient to maintain the splicing tape 100 in a self-supporting manner when applied to the roll. The surface of the release foil 10 on the opposite side from the PSA layer 2 may be primed so that the repositionable adhesive layer 41 adheres to the primed layer sufficiently for the tape to remain intact during manufacture and handling but allowing the adhesive tape 40, 41 to be removed from the release foil 10. This is, however, not necessary for the invention. The release foil 10 may be primed so that a permanent bond is produced between the adhesive tape 40, 41 and the release foil 10.

The application of the splicing tape as shown in FIG. 5B to the roll is similar to that described for the splicing tape as shown in FIG. 5A.

The connection of the web end 32 is similar to the method described with respect to FIG. 5A.

When the splice is to be made to the trailing edge of a second roll the release foil 10 and the adhesive tape 40, 41 are removed separately or together so as to expose the remaining part layer of PSA 2. The trailing edge of the second roll is then aligned with the first roll 30 and attached to the splicing portion 1,2 by pressing the trailing edge against the exposed PSA layer 2. Any excess sheet material of the trailing edge can be removed by folding against the adhesive join and tearing or cutting as described above with respect to the leading edge of the first roll. The junction between the leading and trailing edges in the centre of the splice may then covered by a further narrower adhesive tape 6 as has been described with respect to FIG. 1A.

With the modification of the first embodiment in accordance with FIG. 5B the means for separating the attachment portion 40, 41 of the splicing tape 100 from the rest of the splicing tape 100 as well as the means for detaching the attachment portion 40, 41 from the sheet material are provided by the weakly adhering preferably repositionable adhesive layer 41.

When the splicing tape 100 according to the first embodiment is used as a flying splice the width of PSA 2 under release foil 11 is normally made narrower than the width of PSA 2 under release foil 10.

Figure 6A:
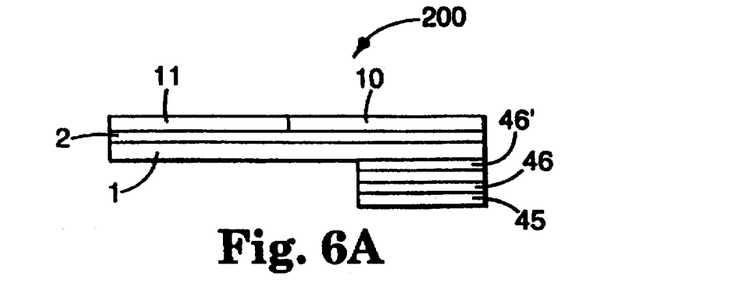
FIGS. 6A to 6D show a second embodiment of a butt splicing tape in accordance with the present invention.

FIG. 6A shows a second embodiment in accordance with the present invention of a butt splicing tape 200. Instead of making use of the repositionable adhesive layer 41, 42 as described with respect to FIGS. 5A to 5D the second embodiment uses a double-sided stretch releasable adhesive layer 46, 46' with a release foil 45 applied along the longitudinal edge of the backing 1 on the opposite face from the PSA layer 2. A stretch releasable adhesive has the property of losing tackiness when its backing material is stretched in the tape longitudinal direction. To remove the stretch releasable tape one end of thereof is stretched in a longitudinal direction which detackifies the adhesive at this end. The operator works, across the width of the roll, detackifying the adhesive by extending the tape. After removal no adhesive is left adhering to the surface of the underlying sheet layer.

A reusable stretch release tape is described in EP-0563057. Extension of the tape detackifies the adhesive coating and the tape returns to its original length on release and the adhesive regains its adhesive properties. Such a tape can be reapplied to the remaining splice tape 1, 2, 10, 11 which can be repositioned.

A non-reusable stretch release tape is described in EP-0563272. After extension of the tape the adhesive is detackified but the tape remains extended and must be discarded. The remaining splice tape 1, 2, 10, 11 may be used in the same way as a conventional butt splicing tape.

The materials of the backing 1, PSA 2 and release foils 10, 11 are similar to those described with respect to the first embodiment. The splicing tape in accordance with the second embodiment of the invention is temporarily attached to the first surface of the underlying winding 31 of the roll 30 by means of the stretch releasable adhesive layer 46 as the attachment portion. When the splice is to be completed the double-sided stretch releasable adhesive layer is extended in the longitudinal direction parallel to splicing portion 1, 2 starting at one end thereof. The extension of the stretch release layer 46, 46' in this direction detackifies the adhesive so that it no longer bonds either to the backing layer 1 or to the underlying layer 31 of the roll 30. Thus the stretch releasable layer 46, 46' may be removed from the splicing area without leaving a residue of adhesive material either on the backing material 1 or on the underlying layer 31 of the roll.

Figure 6B:
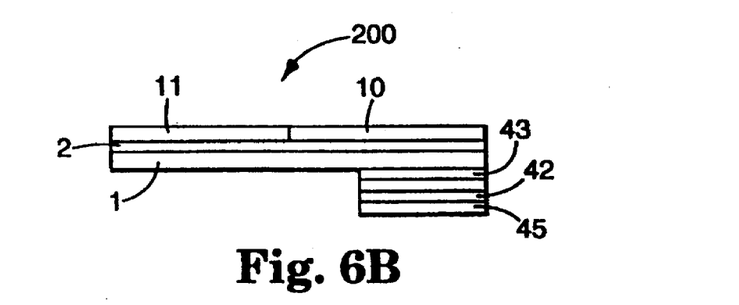

As an alternative to the second embodiment of the invention described above, the double sided stretch release tape may be applied intermittently along the length of the backing 1. The stretch release tape 46, 46' is applied so that the stretch direction of the tape is perpendicular to the longitudinal direction of the splicing tape. Extending beyond the backing 1, non-adhesive gripping portions (not shown) are provided on the ends of the lengths of stretch release tape to enable gripping the stretch release tape. FIG. 6B shows a modification to the splicing tape 200 shown in FIG. 6A. Instead of a double-side stretch release tape a layer of weakly adhering, preferably repositionable adhesive 42 with a release foil 45 is applied to, i.e. connected to and distributed along, the longitudinal edge of the backing 1 below release foil 10.

The weakly adhering preferably repositionable adhesive layer 42 may be provided by a double-sided adhesive tape with a weakly adhering preferably repositionable adhesive layer 42 on one side and a PSA layer 43 on the other. The splicing tape is constructed by attaching the PSA side 43 of this double-sided tape in the appropriate position on the backing 1. The splicing tape 200 may then be positioned on the underlying layer 31 as described for the second embodiment shown in FIG. 6A. Alternatively, the double-sided adhesive tape may be applied to the roll using the weakly adhering, preferably repositionable layer 42 and the splicing tape attached to the exposed PSA layer 43.

After the splicing tape 200 is positioned on the roll the leading and trailing edges of sheet material are attached to the PSA layer 2 as described above. When the sheet material is wound from the drum the splice separates from the underlying winding along the interface of the adhesive layer 42 and the underlying winding. As the adhesive layer 42 is a weakly adhering preferably repositionable adhesive the first surface of the underlying winding is left non-tacky. Care must be taken to prevent a permanent bond between the weakly adhering adhesive layer 42 and the underlying winding during storage.

Figure 6C:
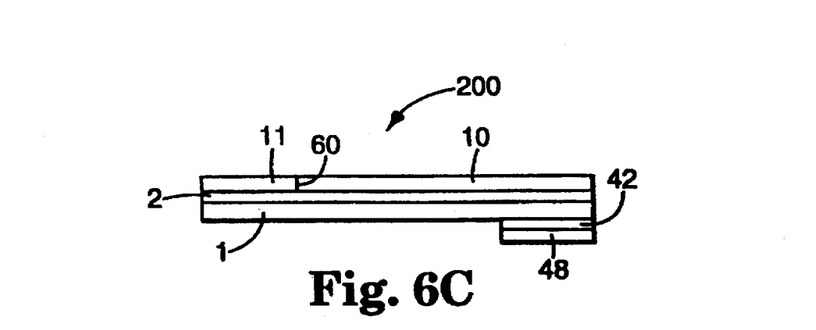
Figure 6D:
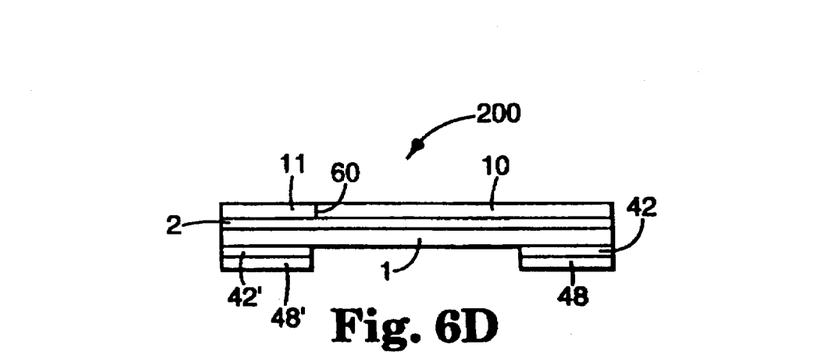

FIG. 6C shows a modification of the second embodiment of the present invention relating to a permanent or flying butt splicing tape 200. The splicing tape 200 in accordance with this modification of the second embodiment includes the splicing portion 1, 2 including a backing 1 covered by an aggressively tacky pressure sensitive adhesive (PSA) 2 which is itself protected by a release foil 10, 11. The release foil 10,11 is provided with a longitudinal weakness, perforation or slit 60. The weakness, perforation or slit 60 is preferably arranged at a position so that the width of the release foil 11 is smaller than the release foil 10. On the opposite surface of the backing 1 from the PSA layer 2 a weakly adhering, preferably repositionable adhesive layer 42 is provided with its own release foil 48 at any suitable position but preferably adjacent to the edge of the splicing tape underneath the release layer 10 as shown. The release foil 48 may be omitted in this embodiment. Further, several strips of repositionable adhesive 42 may be provided across the width of the backing 1 as is shown in FIG. 6D. It is not necessary that the repositionable adhesive layer 42 is continuous along the length of the splicing tape 200. The adhesive may be arranged in discrete lengths or areas therealong provided the splicing tape 200 may be attached to the sheet material across the roll width by means of the discrete repositionable adhesive layers in a self-supporting manner. The splicing tape 200 in accordance with this modification of the second embodiment is applied in the following way. The release foil 48 is removed from the splicing tape, the leading edge of the first roll of sheet material is lifted and the splicing tape is applied across the width of the roll or in a pattern similar to the one shown in FIG. 3A. The splicing tape is secured to the first surface of the underlying winding of the roll of sheet material by the repositionable adhesive layer(s) 42. The release foil 11 is then removed exposing the PSA layer 2. The leading edge of the first roll of sheet material is then carefully laid back and is attached to the splicing tape 200 by pressing it against the PSA layer 2. Any excess of the leading edge is torn off against the edge of the PSA layer 2. In this condition the leading edge of the roll of sheet material is secured to the underlying winding of the roll by means of the repositionable adhesive 42 and there are no exposed areas of adhesive so that the roll may be stored in this condition until required.

Before formation of a flying splice, the release foil 10 is removed exposing the large area of PSA 2 and the marker tape 26 is applied as was described with respect to the conventional procedure in accordance with FIG. 3A. The roll is then brought up to machine speed and the trailing edge of the second roll is pressed against the exposed PSA layer at the appropriate moment. Because the adhesion of the repositionable adhesive 42 to the underlying winding of the sheet roll is adapted to be lower than the strength of the sheet material and also of the adhesion of the splicing tape to the trailing edge of the second roll, the repositionable adhesive layer 42 lifts off from the underlying layer of the new roll leaving no appreciable adhesive residue. The repositionable adhesive layer 42 is designed in such a way that its adhesion to the sheet material is considerably lower than the aggressive PSA layer 2 and its adhesion to the backing 1 is considerably greater than its adhesion to the sheet material of the roll.

The butt splicing tape 200 in accordance with the second embodiment may have both release foils 10 and 11 of the same width when the splicing tape 200 is used to make a permanent butt splice.

In accordance with the second embodiment as described with respect to FIGS. 6A–D, the attachment portion of the splicing tape 200 is provided by the adhesive layer 42. The means for detaching the attachment portion 42 is provided by the adhesive layer 42 being weakly adhering, preferably repositionable. Detachment of the splice between the interface of adhesive layer 42 and the outer surface of the underlying sheet winding leaves this outer surface non-tacky. In the above-mentioned embodiments the attachment portion of the splicing tape is attached to the underlying winding of the roll by the adhesive layer 41, 42, 42' and 46. However this is not necessary to the invention. The attachment portion of the splicing tape may be temporarily and releasably attached to the underlying winding of the roll by other means. The backing 1,40 or the release foil 10 may be treated with corona discharge so that it adheres lightly to a substrate such as the underlying winding of a roll of sheet material.

We claim:

1. A splicing tape for splicing a leading edge of a roll of sheet material to a further sheet material, each winding of said sheet material on said roll having an outer surface facing radially outwards away from said roll, comprising:

a splicing portion and a pre-formed attachment portion, said splicing portion comprising:

an elongate backing member;

an adhesive layer on said backing member, a first part layer of said adhesive layer being provided for attachment of the leading edge of the roll of sheet material substantially across a width of said roll to said backing member and a second part layer of said adhesive layer being for attachment to said further sheet material; and said pre-formed attachment portion being connected to and distributed along said splicing portion for releasable and self-supportive attachment of said splicing tape to the outer surface of an underlying winding of said roll of sheet material substantially across the width of said roll, said attachment portion being adapted for releasing at least said splicing portion from said underlying winding of said roll while leaving the outer surface of said underlying winding in a non-tacky condition.

2. Splicing tape according to claim 1 wherein said adhesive layer is a first adhesive layer and said attachment portion includes:

a second adhesive layer for attachment of said splicing tape to the underlying winding of said roll of sheet material; and releasing means for releasing at least said splicing portion from said underlying winding of said roll.

3. Splicing tape according to claim 2, wherein said second adhesive layer comprises a plurality of adhesive areas applied intermittently along said splicing portion.

4. Splicing tape in accordance with claim 2, wherein said releasing means includes separating means for separating said attachment portion from said splicing portion.

5. Splicing tape in accordance with claim 4, wherein said separating means is provided by said second adhesive layer which is a weakly adhering adhesive layer.

6. Splicing tape in accordance with claim 5, wherein said weakly adhesive layer is a repositionable adhesive layer.

7. Splicing tape in accordance with claim 4, wherein said separating means is provided by said second adhesive layer which is a stretch releasable adhesive layer.

8. Splicing tape in accordance with claim 2, wherein said releasing means includes detaching means for detaching said second adhesive layer from the outer surface of said underlying winding of said roll.

9. Splicing tape in accordance with claim 8, wherein said detaching means is provided by said second adhesive layer which is a weakly adhering adhesive layer.

10. splicing tape in accordance with claim 8, wherein said detaching means is provided by said second adhesive layer which is a stretch releasable adhesive layer.

11. A splice on a leading edge of a roll of sheet material for attachment to a further sheet material, each winding of said sheet material on said roll having an outer surface facing radially outwards from said roll, comprising:

a splicing portion and a pre-formed attachment portion, said splicing portion comprising:

an elongate backing member;

an adhesive layer on said backing member, a first part layer of said adhesive layer attaching the leading edge of the roll of sheet material substantially across a width of said roll to said backing member and a second part layer of said adhesive layer being provided for attachment to said further sheet material; and said pre-formed attachment portion is connected to and distributed along said splicing portion and releasably and self-supportively attaching said splicing tape to the outer surface of an underlying winding of said roll of sheet material substantially across the width of said roll, said attachment portion being adapted for releasing at least said splicing portion from said underlying winding of said first roll while leaving the outer surface of said underlying winding in a non-tacky condition.

12. A splice according to claim 11, wherein said adhesive layer is a first adhesive layer and said attachment portion includes:

a second adhesive layer attaching said splicing tape to the underlying winding of said roll of sheet material; and releasing means for releasing at least said splicing portion from said underlying winding of said roll.

13. A splice in accordance with claim 12, wherein said releasing means includes separating means for separating said attachment portion from said splicing portion.

14. A splice in accordance with claim 13, wherein said separating means is provided by said second adhesive layer which is a weakly adhering adhesive layer.

15. A splice in accordance with claim 14, wherein said weakly adhering adhesive layer is a repositionable adhesive layer.

16. A splice in accordance with claim 13, wherein said separating means is provided by said second adhesive layer which is a stretch releasable adhesive layer.

17. A splice in accordance with claim 11, wherein said releasing means includes detaching means for detaching said second adhesive layer from the outer surface of said underlying winding of said roll.

18. A splice in accordance with claim 17, wherein said detaching means is provided by said second adhesive layer which is a weakly adhering adhesive layer.

19. A splice in accordance with claim 17, wherein said detaching means is provided by said second adhesive layer which is a stretch releasable adhesive layer.

20. A method for preparing a splice between a leading edge of a roll of sheet material and a further sheet material using a splicing tape, each winding of said sheet material on said roll having an outer surface facing radially outwards away from said roll, said splicing tape comprising:

a splicing portion and a pre-formed attachment portion, in which method said splicing tape is attached to the outer surface of an underlying winding using said attachment portion substantially across a width of said roll, said splicing portion comprising:
an elongate backing member;
an adhesive layer on said backing member and covered by at least one release foil, a first part layer of said adhesive layer being provided for attaching the leading edge of said roll of sheet material substantially across the width of said roll to said backing member and a second part layer of said adhesive layer being provided for attachment to said further sheet material;

said pre-formed attachment portion being connected to and distributed along said splicing portion for self-supportively and releasably attaching said splicing tape to the outer surface of the underlying winding of said roll of sheet material substantially across the width of said roll, said attachment portion being adapted for releasing at least said splicing portion from the underlying winding of said roll while leaving the outer surface of the underlying winding in a non-tacky condition, said method further comprising the steps of:

exposing the first part layer of said adhesive layer;

attaching said leading edge to the exposed first part layer of said adhesive layer; and separating said attachment portion from said splicing portion attached to said leading edge while leaving the outer surface of said underlying winding in a non-tacky condition.

21. A method for making a splice between a leading edge of a roll of sheet material and a further sheet material using a splicing tape, each winding of said sheet material on said roll having an outer surface facing radially outwards away from said roll, said splicing tape comprising:

a splicing portion and a pre-formed attachment portion, in which method said splicing tape is attached to the outer surface of an underlying winding using said attachment portion substantially across a width of said roll, said splicing portion comprising:

an elongate backing member;

an adhesive layer on said backing member and covered by at least one release foil, a first part layer of said adhesive layer being provided to attach the leading edge of the roll of sheet material substantially across the width of said roll to said backing member, and a second part layer of said adhesive layer being provided for attachment to the further sheet material;

said pre-formed attachment portion being connected to and distributed along said splicing portion for self-supportively and releasably attaching said splicing tape to the outer surface of the underlying winding of said roll of sheet material substantially across the width of said roll, said attachment portion being adapted for releasing at least said splicing portion from the underlying winding of said roll while leaving the outer surface of the underlying winding in a non-tacky condition, said method further comprising the steps of:

exposing said first part layer of said adhesive layer;

attaching said leading edge to the exposed first part layer of said adhesive layer;

exposing said second part layer of said adhesive layer;

attaching the further sheet material to the exposed second part of said adhesive layer; and releasing said leading edge and said splicing portion attached thereto from said underlying winding while leaving the outer surface of said underlying winding non-tacky.

\* \* \* \* \*

UNITED STATES PATENT AND TRADEMARK OFFICE
CERTIFICATE OF CORRECTION

PATENT NO. : 5,692,699
DATED : December 2, 1997
INVENTOR(S) : Hans Julius Weirauch, Kees Kleinjan, Emile Couvee, and Max Holderbusch It is certified that error appears in the above-identified patent and that said Letters Patent is hereby corrected as shown below:

Column 2,
Line 30, after "8.", "Splicing" should start a new paragraph;

Column 7,
Line 2, "winding i.e." should read -- winding, i.e. --;
Line 43, "thereof" should read -- thereof. --;

Column 8,
Line 47, "foil 1-1" should read -- foil 11 --;

Column 9,
Line 7, after "roll.", "The surface of" should start a new paragraph;

Column 10,
Line 31, after "tape.", "Fig. 6B" should should start a new paragraph;
Line 40, "adhering preferably" should read -- adherin, preferably -- ; and Column 12,
Line 1, after "tacky.", "In the" should start a new paragraph.

Signed and Sealed this

Twelfth Day of March, 2002

*Attest:*

*Attesting Officer*

JAMES E. ROGAN
*Director of the United States Patent and Trademark Office*